(12) United States Patent  
Wynalda, Jr. et al.

(10) Patent No.: US 7,798,322 B2
(45) Date of Patent: Sep. 21, 2010

(54) MEDIA STORAGE CONTAINER WITH SLIDE OUT TRAY

(75) Inventors: Robert M. Wynalda, Jr., P.O. Box 370, Belmont, MI (US) 49306; Robert G. Rajter, Jr., Rockford, MI (US)

(73) Assignee: Robert M. Wynalda, Jr., Comstock Park, MI (US)

( * ) Notice: Subject to any disclaimer, the term of this patent is extended or adjusted under 35 U.S.C. 154(b) by 0 days.

(21) Appl. No.: 12/356,877

(22) Filed: Jan. 21, 2009

(65) Prior Publication Data
US 2009/0223844 A1   Sep. 10, 2009

Related U.S. Application Data

(60) Provisional application No. 61/022,427, filed on Jan. 21, 2008.

(51) Int. Cl.
*B65D 85/30* (2006.01)
*B65D 5/38* (2006.01)

(52) U.S. Cl. .................. 206/308.1; 206/310; 206/312; 229/125.125

(58) Field of Classification Search ............. 206/308.1, 206/310, 312, 313; 229/125.125
See application file for complete search history.

(56) References Cited

U.S. PATENT DOCUMENTS

| 4,488,644 | A | 12/1984 | Wynalda, Jr. |
| RE32,296 | E | 11/1986 | Wynalda, Jr. |
| 5,088,599 | A | 2/1992 | Mahler |
| 5,379,890 | A | 1/1995 | Mahler |
| 5,421,452 | A * | 6/1995 | Hybiske ................ 206/312 |
| 5,819,928 | A | 10/1998 | Wynalda, Jr. |
| 5,960,949 | A | 10/1999 | Wynalda, Jr. |
| 6,032,795 | A * | 3/2000 | Ehrlund et al. ........... 206/312 |
| 6,283,281 | B1 * | 9/2001 | Pandolph et al. ......... 206/308.1 |
| 6,845,865 | B2 | 1/2005 | Wynalda, Jr. |
| 7,028,835 | B1 | 4/2006 | Rajter |
| 7,225,921 | B2 | 6/2007 | Pelczarski |
| 2003/0000854 | A1 * | 1/2003 | Jang ................ 206/308.1 |
| 2006/0151343 | A1 | 7/2006 | Cheung |
| 2006/0191809 | A1 | 8/2006 | Heuser et al. |

* cited by examiner

*Primary Examiner*—Byron P Gehman
(74) *Attorney, Agent, or Firm*—Zollinger & Burleson Ltd.

(57) ABSTRACT

A media storage container has a sleeve and a slide out tray wherein the sleeve includes a feature that helps to hold the disc in the tray in the event the disc holding hub breaks. In one configuration, the sleeve includes a tab that has been folded over at least once such that the tab is wedged between the inner surface of the upper wall of the sleeve and the top of the disc holding hub. In another configuration, the tab is folded over itself twice to create three layers of tab material between the inner surface of the upper wall of the sleeve and the disc holding hub.

16 Claims, 5 Drawing Sheets

MEDIA STORAGE CONTAINER WITH SLIDE OUT TRAY

CROSS REFERENCE TO RELATED APPLICATIONS

This application claims the benefit of U.S. Provisional Patent Application Ser. No. 61/022,427 filed Jan. 21, 2008; the disclosures of which are incorporated herein by reference.

BACKGROUND OF THE INVENTION

1. Technical Field

The present invention relates generally to media storage containers and, more particularly, to media storage containers adapted to store and display a disc-shaped item of recorded media. Specifically, the invention relates to a media storage container having a holder tray that slides out of a sleeve with the sleeve having a tab configured to engage the disc to hold the disc in the tray if the disc holding hub breaks.

2. Background Information

Various media storage containers are known in the art. Some of the most common storage containers for recorded media are plastic book-like containers having a lid connected to a base with a hinge. The media disc is held by a hub in the base of the container.

Some retailers and customers desire a media storage container manufactured entirely from recycled paper and recyclable paper. In order to serve this market, disc holding trays with disc holding hubs have been molded from recycled paper pulp. These pulp trays are received in a paper sleeve that prevents the tray from falling out of the sleeve. A problem with these pulp trays is that the disc holding hubs tend to break and release the disc.

BRIEF SUMMARY OF THE INVENTION

The invention provides a media storage container having a sleeve and a slide out tray wherein the sleeve includes a feature that helps to hold the disc in the tray in the event the disc holding hub breaks.

In one configuration, the sleeve includes a tab that has been folded over at least once such that the tab is wedged between the inner surface of the upper wall of the sleeve and the top of the disc holding hub. In another configuration, the tab is folded over itself twice to create three layers of tab material between the inner surface of the upper wall of the sleeve and the disc holding hub.

In one configuration, the tab includes a first portion that is connected to the upper wall of the sleeve with a living hinge. The first portion of the tab includes an intermediate portion having a width that is greater than the disc-receiving recess defined by the disc holding tab.

These configurations are provided individually and in combination with one another to form additional configurations. Examples of the invention are described below.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
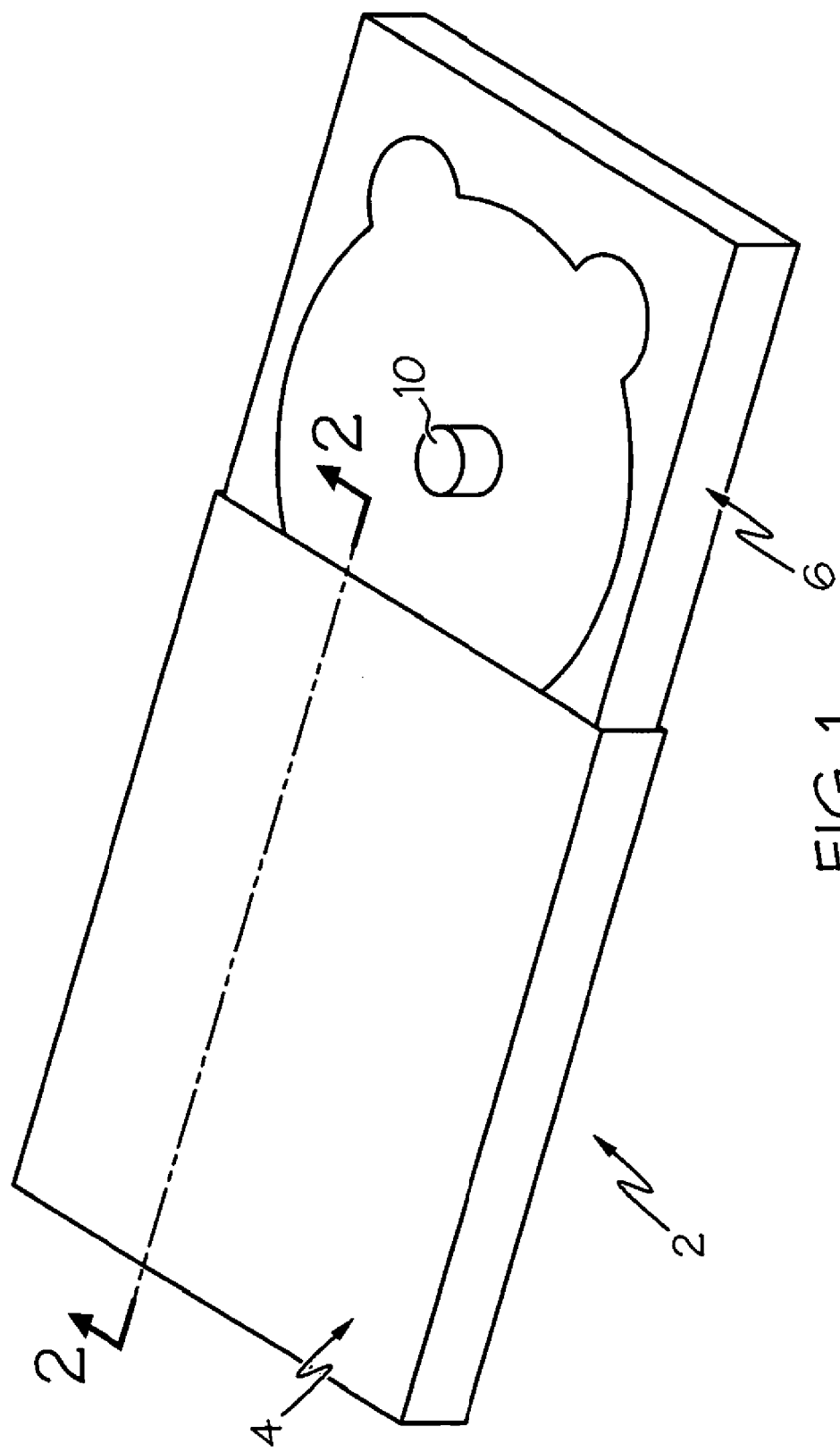
FIG. 1 is a perspective view of a media storage container with the holder tray partially slid out to an open configuration.
Figure 2:
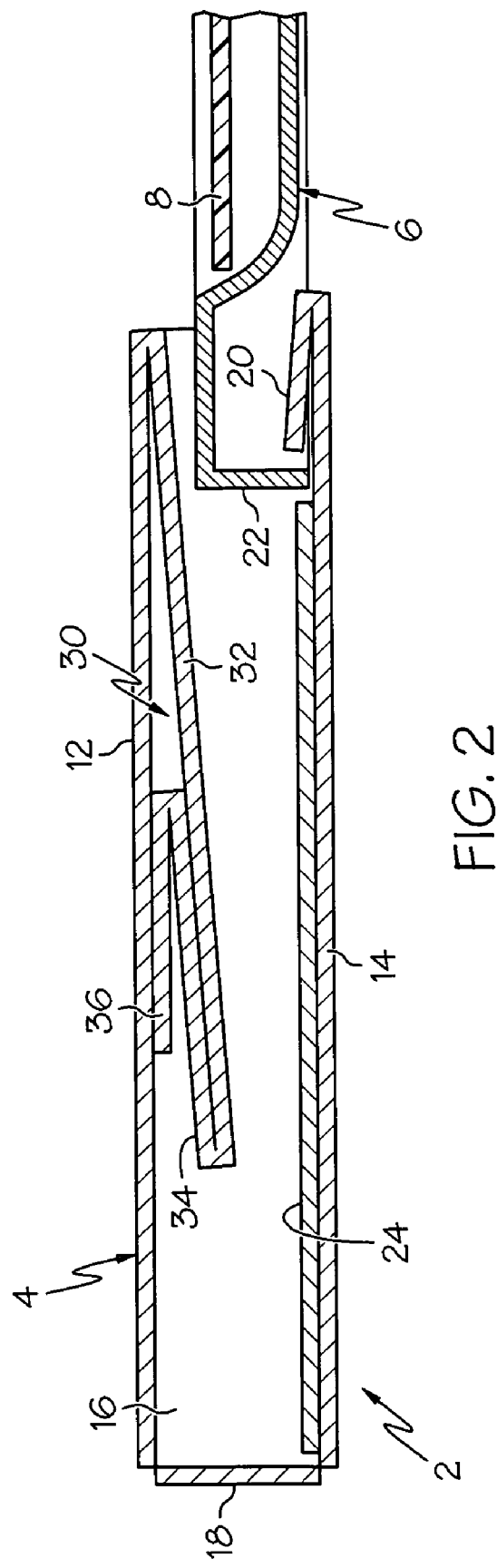
FIG. 2 is a section view taken along line 2-2 of FIG. 1.
Figure 3:
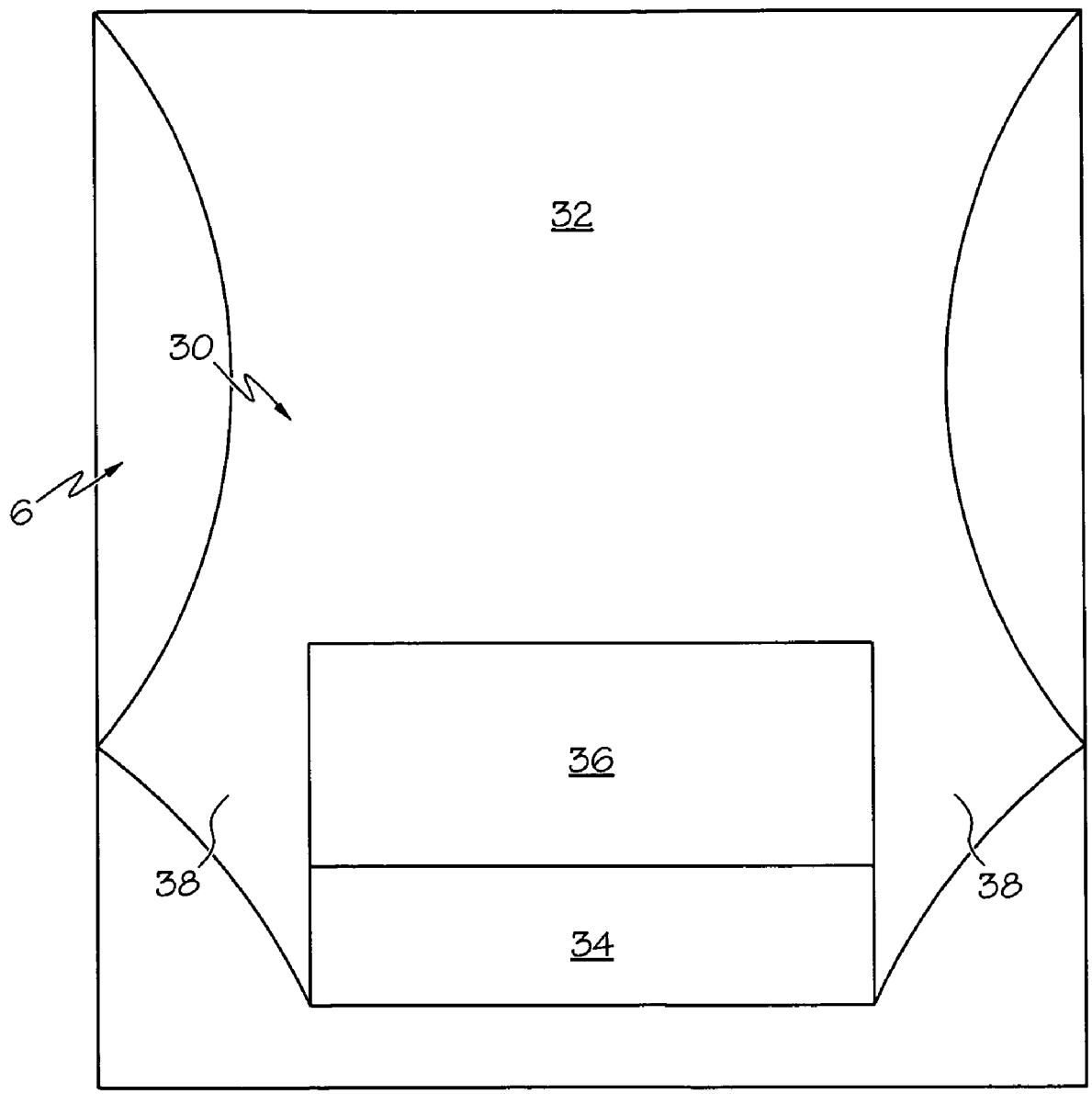
FIG. 3 is a plan view of the tab disposed over the tray with the sleeve not being shown.
Figure 4:
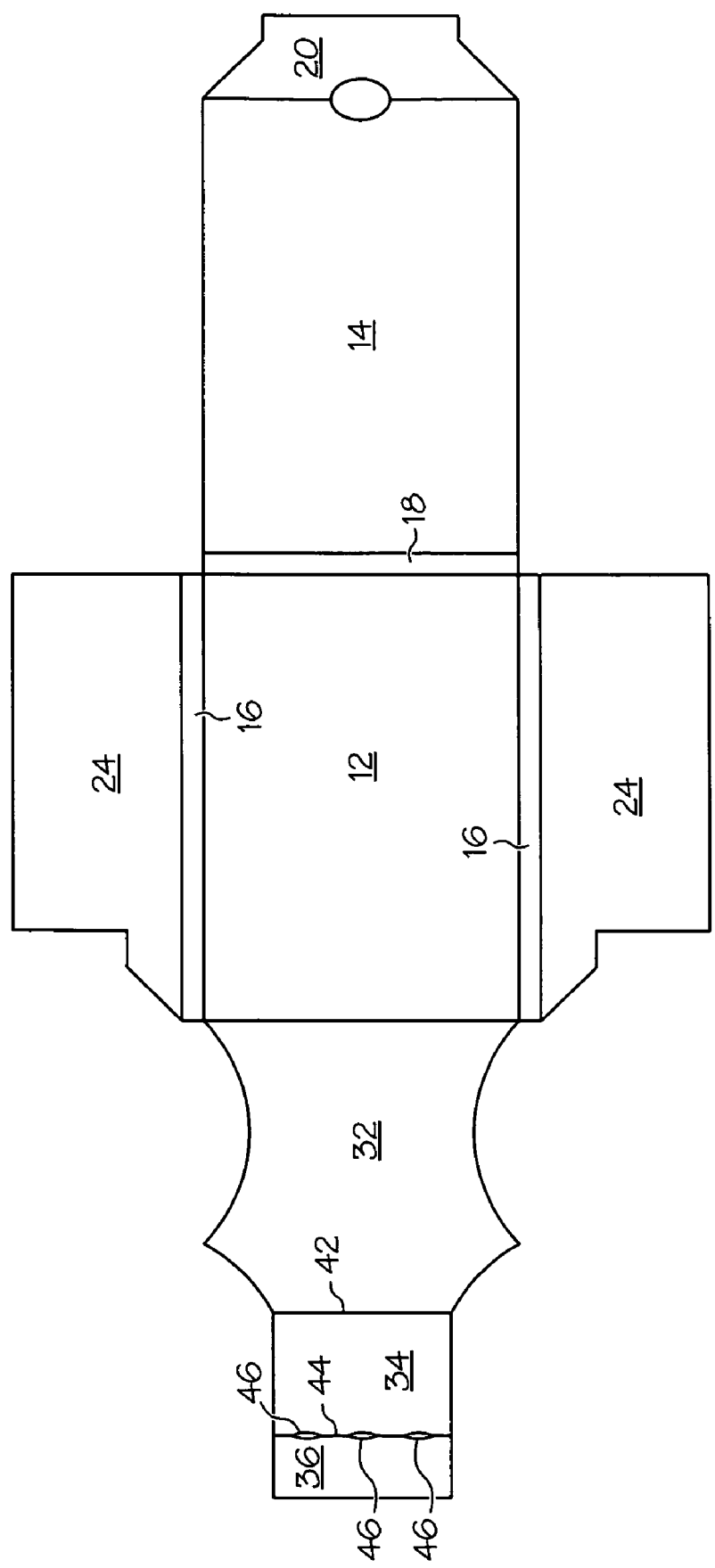
FIG. 4 is a top plan view of a blank that may be used to form the sleeve.
Figure 5:
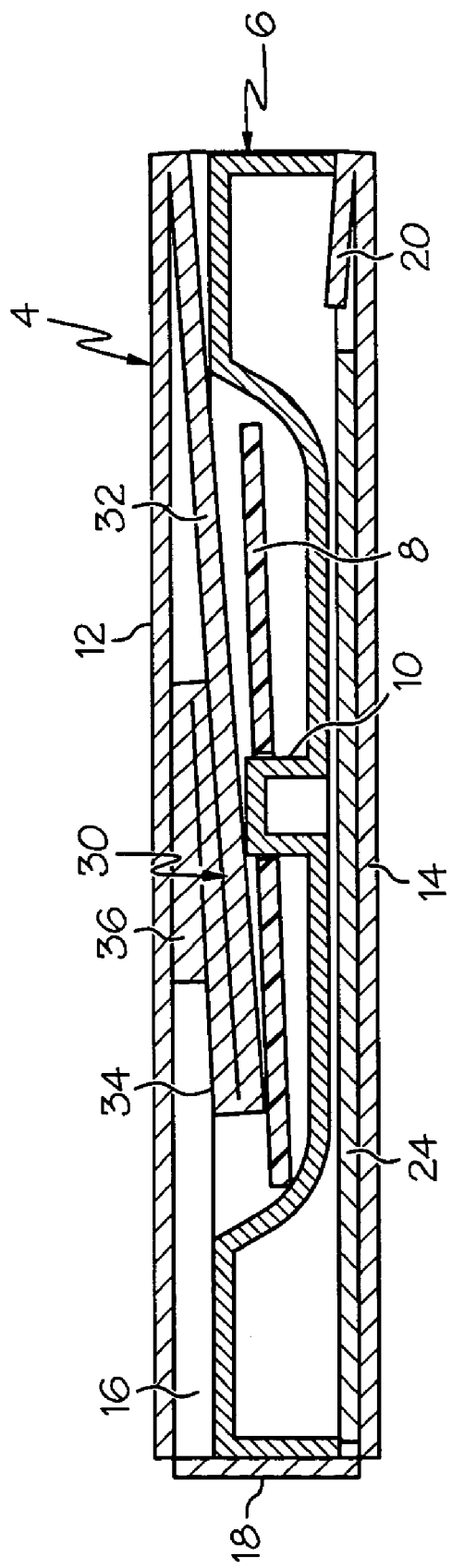
FIG. 5 is a section view similar to FIG. 2 showing the tab engaging the top of the tray when the sleeve is disposed inside the sleeve.

A first configuration of the media storage container is indicated generally by the numeral 2 in the accompanying drawings. Container 2 includes an outer sleeve 4 and a holder tray 6 that moves between a retracted position within sleeve 4 and an extended position wherein an item 8 disposed in tray 6 may be removed from tray 6. One exemplary configuration of container 2 is a media storage container wherein tray 6 is configured to hold at least one disc-shaped item of recorded media 8 such as a DVD or a CD. Tray 6 holds the item of recorded media in any of a variety of known manners such as a frictional arrangement at the outer edge of disc 8 or a snap hub 10 that engages the central opening of disc 8.

Sleeve 4 is generally in the form of a five-sided box and includes an upper wall 12, a lower wall 14 that is spaced from upper wall 12 by a pair of sidewalls 16 and an end wall 18. A retaining flange 20 extends from the end of lower wall 14 that is opposite end wall 18. Retaining flange 20 is folded inside sleeve 4 and is used to catch on the inside of a perimeter wall 22 of tray 6 to prevent tray 6 from being readily pulled out of sleeve 4. Inner panels 24 extend from sidewalls 16. Inner panels 24 are folded inside sleeve 4 and are disposed against, and may be adhesively secured to, the inner surface of lower wall 14. Tray 6 thus slides over the inner surfaces of inner panels 24. The inner chamber of sleeve 4 is thus reduced by the thickness of panels 24. Panels 24 may be overlapped to further decrease the height of the chamber within sleeve. Panels 24 help sleeve 4 tightly engage tray 6 and to maintain hub 10 close to upper wall 12.

Sleeve 4 includes a tab 30 configured to engage the upper surface of disc 8 to hold disc 8 within tray 6 even if hub 10 is damaged. Tab 30 is cantilevered inside sleeve 4 in a position where it is disposed against the upper surface of disc 8 when tray 6 is in the closed position.

In one configuration, tab 30 includes first 32, second 34, and third 36 portions that are connected together with folds that function as living hinges. The material of tab 30 is thick enough to prevent the portions from folding flat against one another thereby creating some resiliency in tab 30. A paperboard material may be used to create these folds. When tab 30 is disposed within sleeve 4, three layers of material are trapped between the upper surface of tray 6 and the inner surface of upper wall 12 thus wedging tray 6 between tab 30 and the inner surfaces of panels 24. With tab 30 being tightly disposed over the top of tray 6, disc 8 is held within tray 6 even if hub 10 has been damaged.

First portion 32 of tab 20 that is disposed directly against the upper surface of tray 6 includes an intermediate portion 38 that is at least as wide as disc 8. First portion 32 is tapered down with a curved taper to thinner widths on both sides of intermediate portion 38. The tapering creates a pair of points 40 that may be spaced apart almost as wide as the inner surface of upper panel 12.

The fold 42 between portion 32 and portion 34 is not slit so that it retains much of its resiliency. The fold 44 between portion 34 and 36 may define spaced slits 46 that allow portion 36 to be folded easily.

The invention claimed is:

1. A media disc storage container comprising:

a sleeve having an upper wall with an inner surface;

a slide out tray carried by the sleeve; the slide out tray being movable between a retracted position wherein the tray is disposed within the sleeve and an extended position adapted to allow an item carried by the tray to be removed from the tray; the slide out tray having a disc holding hub adapted to hold a media disc; the hub having a top; and the sleeve including a retaining tab that is disposed directly between the inner surface of the upper wall of the sleeve and the top of the disc holding hub when the slide out tray is disposed in the retracted position in the sleeve.

2. The container of claim 1, wherein the retaining tab includes first and second portions; the first portion being connected to the sleeve and the second portion extending from the first portion; both of the first and second portions of the retaining tab being disposed directly between the top of the disc holding hub and the inner surface of the upper wall when the tray is disposed in the retracted position in the sleeve.

3. The container of claim 2, wherein the second portion of the retaining tab is disposed between the inner surface of the upper wall and the first portion of the retaining tab.

4. The container of claim 2, further comprising a third portion of the retaining tab connected to the second portion of the retaining tab; the third portion of the retaining tab being disposed between the inner surface of upper wall and the first portion of the retaining tab.

5. The container of claim 4, wherein the third portion of the retaining tab is disposed between the inner surface of the upper wall and the second portion of the retaining tab.

6. The container of claim 1, wherein the first portion of the retaining tab includes a wide intermediate portion and a pair of thin portions disposed on either side of the wide intermediate portion.

7. The container of claim 6, wherein the wide intermediate portion includes a pair of points; the tray having a pair of opposed edges; and the points being disposed above the edges.

8. A media disc storage container comprising:
a sleeve having an upper wall with an inner surface;
a slide out tray carried by the sleeve; the slide out tray being movable between a retracted position wherein the tray is disposed within the sleeve and an extended position adapted to allow a media disc carried by the tray to be removed from the tray; the slide out tray having a disc holding hub adapted to hold the media disc; the hub having a top; and
the sleeve including a retaining tab; the retaining tab having a front connected to the sleeve and a rear disposed opposite the front; the hub being disposed intermediate the front of the retaining tab and the rear of the retaining tab when the tray is disposed in the retracted position in the sleeve.

9. The container of claim 8, wherein the retaining tab includes a first portion and a second portion; the first portion defining the front and rear of the retaining tab; the first portion extending from the sleeve and the second portion extending from the first portion.

10. The container of claim 9, wherein the second portion of the retaining tab is disposed between the first portion of the retaining tab and the upper wall of the sleeve.

11. The container of claim 10, further comprising a third portion of the retaining tab connected to the second portion; the third portion of the retaining tab being disposed between the inner surface of upper wall and the first portion of the retaining tab.

12. The container of claim 11, wherein the third portion of the retaining tab is disposed between the inner surface of upper wall and the second portion of the retaining tab.

13. A media disc storage container comprising:
a sleeve having an upper wall with an inner surface;
a slide out tray carried by the sleeve; the slide out tray being movable between a retracted position wherein the tray is disposed within the sleeve and an extended position adapted to allow an media disc carried by the tray to be removed from the tray;
the slide out tray having a reception area adapted to receive the media disc;
the sleeve including a retaining tab; the retaining tab having a front connected to the sleeve and a rear disposed opposite the front;
the retaining tab includes a first portion and a second portion; the first portion defining the front and rear of the retaining tab; the first portion extending from the sleeve and the second portion extending from the first portion; and
the first and second portions of the retaining tab being disposed directly between the inner surface of the upper wall and the reception area and the second portion being disposed directly between the inner surface of the upper wall and the first portion of the retaining tab.

14. The container of claim 13, wherein the tray includes a disc holding hub and the second portion of the retaining tab is disposed between the hub and the inner surface of the upper wall of the sleeve when the tray is disposed in the retracted position.

15. The container of claim 13, further comprising a third portion of the retaining tab connected to the second portion; the third portion of the retaining tab being disposed between the inner surface of upper wall and the first portion of the retaining tab.

16. The container of claim 15, wherein the third portion of the retaining tab is disposed between the inner surface of the upper wall and the second portion of the retaining tab.

* * * * *